G. HARLOW & K. M. FAYE-HANSEN.
PROTECTIVE APPARATUS FOR ALTERNATING CURRENT DISTRIBUTION SYSTEMS.
APPLICATION FILED APR. 18, 1911.

1,151,783.

Patented Aug. 31, 1915.

WITNESSES:

INVENTORS
George Harlow
& Karl Martin Faye-Hansen
BY
ATTORNEY

UNITED STATES PATENT OFFICE.

GEORGE HARLOW, OF TIMPERLEY, AND KARL MARTIN FAYE-HANSEN, OF STRETFORD, ENGLAND, ASSIGNORS TO WESTINGHOUSE ELECTRIC AND MANUFACTURING COMPANY, A CORPORATION OF PENNSYLVANIA.

PROTECTIVE APPARATUS FOR ALTERNATING-CURRENT-DISTRIBUTION SYSTEMS.

1,151,783.  Specification of Letters Patent.  Patented Aug. 31, 1915.

Application filed April 18, 1911. Serial No. 621,919.

*To all whom it may concern:*

Be it known that we, GEORGE HARLOW, a subject of the King of Great Britain, and KARL MARTIN FAYE-HANSEN, a subject of the King of Norway, residents, respectively, of Timperley, in the county of Chester, England, and Stretford, in the county of Lancaster, England, have invented a new and useful Improvement in Protective Apparatus for Alternating-Current-Distribution Systems, of which the following is a specification.

Our invention relates to protective apparatus for alternating current distribution systems of the kind in which the feeder conductors of the system are divided into a plurality of sections separated from one another by circuit breakers. In distribution systems of this kind it is usual to provide devices for automatically opening the circuit breakers at each end of a section in the event of any fault occurring in the said section and the present invention provides improved arrangements of protective apparatus of this kind which are simpler and cheaper than those heretofore employed.

According to the present invention, the primary winding of a series transformer is connected at each end of the feeder section to be protected, the secondary windings of these transformers being connected together by means of resistances and pilot wires in such manner that equipotential points in the pilot circuit thus formed exist under normal conditions, the tripping coils of the circuit breakers being connected between these equipotential points so that normally no current traverses the said tripping coils. Any accident to the feeder section involving relative change in the currents traversing the series transformers at each end of the said section will evidently disturb the electrical equilibrium of the pilot circuit, so that the points between which the tripping coils of the circuit breakers are connected are no longer at the same potential and currents are therefore supplied to these tripping coils to open the circuit breakers and isolate the faulty section of the feeder.

The invention is illustrated in the accompanying drawings of which—

Figures 1 to 5 are diagrammatic views showing our protective devices applied to different kinds of distribution systems.

Figure 1:
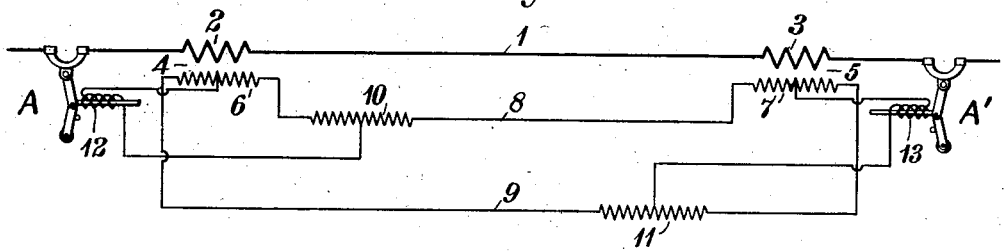

Referring now to Fig. 1, which illustrates the invention as applied to a single-phase distribution circuit, one section of a feeder conductor is indicated at 1 and includes the primary windings 2 and 3 of two series transformers 4 and 5 which are located at the respective ends of the section. The terminals of the secondary windings 6 and 7 of the transformers 4 and 5 are connected together by pilot wires 8 and 9, a resistance 10 of suitable value being connected in the pilot wire 8 at one end of the feeder section and a similar resistance 11 being connected in the other pilot wire 9 at the opposite end of the feeder section, the section being provided, according to the usual practice, with circuit-breakers A and A' at its respective ends. The tripping coil 12 of the circuit-breaker A is connected between an intermediate point in the secondary winding 6 of one of the series transformers and a point in the adjacent resistance 10 which is at the same potential, under normal conditions of current flow in the section. The tripping coil 13 of the circuit-breaker A' at the other end of the section is similarly connected between intermediate points in the transformer winding 7 and in the adjacent resistance 11, respectively. The operation of this form of the protective system of our invention is as follows: The secondary windings 6 and 7 of the transformers 4 and 5, together with the pilot wires 8 and 9 and their corresponding resistances 10 and 11, form a closed pilot circuit which is continually traversed by current so long as the direction and magnitude of the flow of current in the primary windings 2 and 3 of the transformers 4 and 5 are the same. The electromotive force generated by each of the transformer secondary windings 6 and 7 is, therefore, under normal conditions, equal to the drop of potential in the corresponding resistance 10 or 11, the resistance of the pilot wires 8 and 9 being regarded as negligible. It is therefore possible to find any number of points in the secondary windings 6 and 7 of the transformers which are at the same potential as corresponding points in the resistances 10 and 11, and the tripping coils 12 and 13 of the circuit breakers, if connected across pairs of equipotential points thus selected, will not be traversed by current, under normal conditions. In case the magnitude or direction of the flow of current in either of the primary windings 2 and 3 of the series transformers be altered relatively to the magnitude or direction of current flow in the other of the said transformers, however, the points in the secondary windings of the transformers and their corresponding resistances across which the tripping coils of the circuit-breakers are connected, will no longer be at the same potential and the tripping coils of the circuit-breakers will be traversed by currents which serve to effect the opening of the circuit-breakers and the disconnection of the feeder section.

Figure 2:
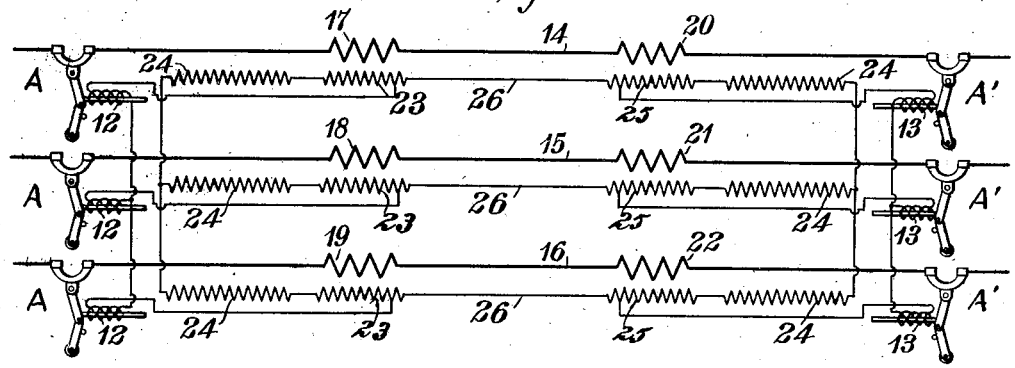
Figure 3:
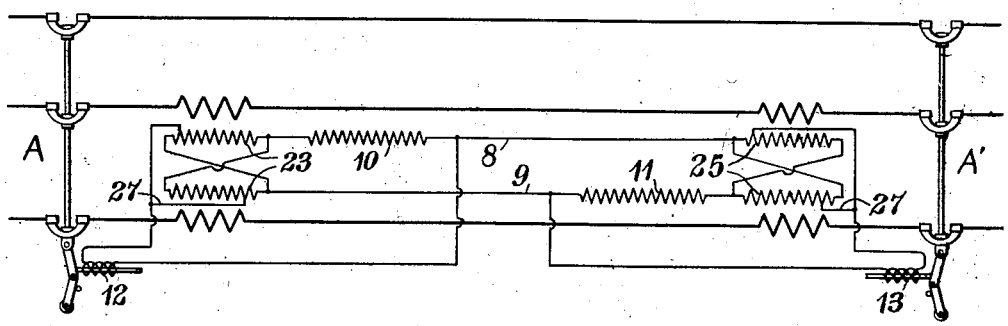

Referring now to Fig. 2, the invention is illustrated as applied to a three-phase circuit in which each of the conductors 14, 15 and 16 of the feeder section is provided with series transformers 17, 18 and 19 at one end of the section and similar series transformers 20, 21 and 22 at the other end of the section. The secondary windings 23 of the series transformers 17, 18 and 19 are star-connected through resistances 24, a similar connection being adopted for the secondary windings 25 of the series transformers 20, 21 and 22. The outer ends of the star-connected windings 23 and 25 are connected together by means of pilot wires 26 so that a closed pilot wire system comprising the secondary windings 23 and 25 of the series transformers and the resistances 24 is formed. The tripping coils 12 of the circuit-breakers A at one end of the section are, in this case, connected together in star with their outer ends connected to the adjacent ends or other intermediate points of the secondary windings 23 of the series transformers, as shown, the tripping coils 13 for the circuit-breakers A' at the other end of the section being similarly connected. The series transformers 17, 18, 19, 20, 21 and 22 must, in this instance, be of the kind having their magnetic cores provided with air gaps in order to reduce the impedance offered by these windings to the passage of a current through the tripping coils when a fault occurs in the section. The operation of this form of the protective apparatus is as follows: So long as normal conditions of the flow of current in the section exist, the points in the transformer windings 23 and 25 to which the outer ends of the star-connected tripping coils 12 and 13 are connected will evidently be equipotential points. If, however, a fault occurs in any of the conductors of the section, so that the relative magnitude or direction of flow of currents in the two sets of series transformers 17, 18 and 19, and 20, 21 and 22 is altered, the electrical balance of the pilot wire system will be disturbed and local currents will traverse the tripping coils 12 and 13 and cause the circuit-breakers to open and isolate the section. The protective apparatus of our invention may also be applied to a three-phase system, one phase conductor of which is grounded, or to a two-phase three-wire system, or to a single-phase three-wire system with one of the conductors grounded, as illustrated in Fig. 3. According to this arrangement, series transformers need only be provided in the two conductors of the system which are not grounded. The secondary windings 23 and 25 of these transformers are cross-connected in parallel with one another to the pilot wires, 8 and 9 which severally contain suitable resistances 10 and 11, the connections being similar to those already described with reference to Fig. 1. In this case also, equipotential points in the transformer windings 23 exist and are connected together by means of a conductor 27. The conductor 27 is also evidently at the same potential as some point in the resistance constituted by the resistance 10 and the pilot conductor 8, under normal conditions of current flow in the feeder section. The tripping coil 12 of the circuit-breaker at the corresponding end of the section is therefore connected between this point and the conductor 27. The connections at the other end of the feeder section are precisely similar and, as will be readily understood from the description already given, the tripping coils 12 and 13 will only be traversed by current in the event of a fault occurring in the section.

Figure 4:
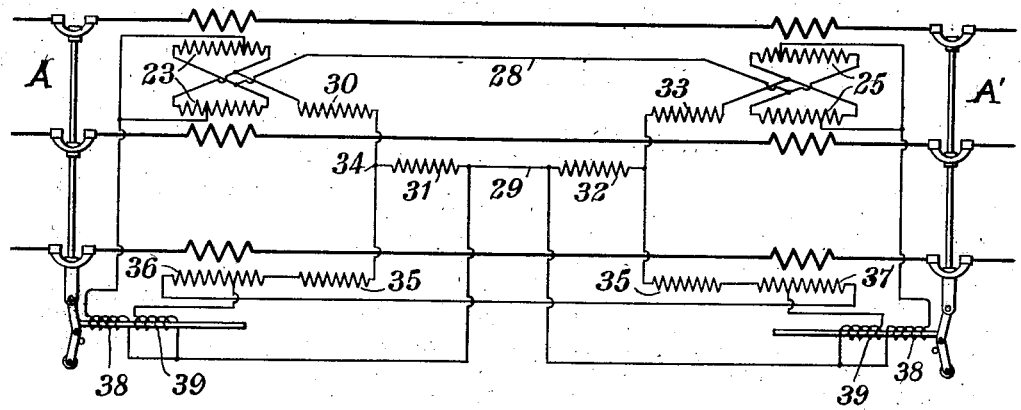

Referring now to Fig. 4, another protective system embodying the invention as applied to a three-phase distribution circuit is illustrated in which the secondary windings 23 of two of the series transformers at one end of the section are connected in parallel with one another to the corresponding windings 25 of the transformer at the other end of the section by means of two pilot conductors 28 and 29, one (29) of which contains four resistances 30, 31, 32 and 33, the resistances 30 and 31 being located at one end of the section and the resistances 32 and 33 at the opposite end. A point 34, intermediate the resistances 30 and 31, is connected, through a third resistance 35 and the secondary winding 36 of the remaining series transformer, to the secondary winding 37 of the corresponding series transformer at the opposite end of the section. Two tripping coils 38 and 39 are provided for the circuit-breakers at each end of the section, the coil 38 being connected between intermediate points in the windings 23 and a point in the pilot conductor 29 intermediate the resistances 31 and 32 and the other tripping coil 39 being connected across an intermediate point in the secondary winding 36 and the point intermediate the resistances 31 and 32, above referred to. With this arrangement, the series transformers employed may be of ordinary construction with closed iron magnetic circuits, since the current supplied to the tripping coils 38 and 39 from the secondary windings of the series transformers, in the event of a fault occurring in the feeder section, has only to pass through the resistances 30 and 31 or 31 and 35 and the tripping coil itself, and the impedance of the transformer windings need not therefore be considered.

Figure 5:
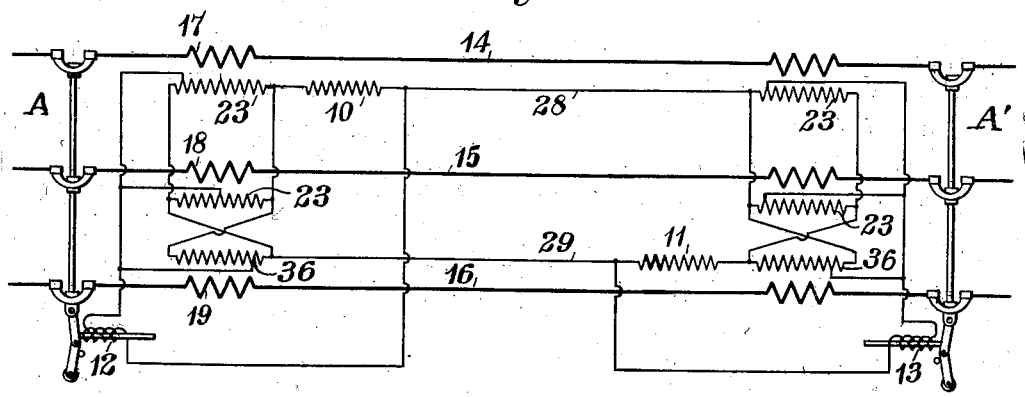

Referring now to Fig. 5, another method of connecting the various elements of the protective apparatus, as applied to a three-phase distribution, is illustrated, in which the secondary windings 23 of two of the series transformers at each end of the section are directly connected in parallel with each other and cross connected in parallel with the secondary winding 36 of the third series transformer; the two closed circuits thus formed at each end of the feeder section being connected together, as shown, by means of two pilot wires 28 and 29, which respectively contain resistances 10 and 11, one adjacent to each end of the feeder section. The single tripping coil 12 of the circuit-breaker at each end of the section is connected between points intermediate the ends of the secondary windings 23 and 36 of the three series transformers at one end of the section and a point in the pilot conductor 28 beyond the resistance 10, as shown, the connections at the opposite end of the section being precisely similar. In order to insure the excitation of the tripping coils 12 and 13 when a short circuit occurs between the phase conductors 14 and 15, the transformers connected in these conductors must be so designed as to have different transformation ratios.

The resistances referred to above are preferably approximately equal to or smaller than the resistance of the pilot wires employed, and as will be readily understood, any pairs of equipotential points may be selected which will give the desired effect. Furthermore, the invention may be utilized for effecting the opening of the circuit-breakers of a distribution system of the kind described, when an overload occurs, by so arranging the connections of the tripping coils of the circuit-breakers that the said coils are not connected to points of exactly equal potential but are traversed by currents varying with the load on the feeder section.

It will be understood that, although, in the above examples, separate series transformers for each phase conductor have been referred to, a single transformer at each end of the feeder section may be employed, if desired, such transformer having a number of primary windings corresponding to the number of series transformers which it replaces and one or more secondary windings arranged to give the same effect as the secondary windings of the system in question. These and other variations from the arrangement described may evidently be made without exceeding the scope of the invention. It is evidently also possible to adapt the invention for the protection of T-connected feeders for both single-phase or poly-phase systems.

When a system has a grounded neutral and one of the other conductors becomes grounded, there is a condition existing similar to that condition when one conductor becomes short circuited on another, in which case, the transformer nearest the source of energy will have a relatively larger current flowing in it than before the ground or short circuit occurred, while the transformer farther away from the source of energy will have less current in it. This increased current will cause an increase in the current flowing in the secondary winding, while there is a decrease in the current in the secondary winding of the other transformer. Thus, since the transformers are no longer of the same potential, the points of equipotential are not the same as before and there will be a potential across the points which were normally at the same potential causing the circuits to be interrupted. A two-phase circuit comprises two single phase circuits and, consequently, two protective circuits similar to those shown in Fig. 1 may be used to isolate sections of the same under abnormal conditions. When any wire of a three-phase system becomes grounded, that allows the current to drop in the transformer which is located at the greater distance from the source of energy. This change in current is accompanied by a proportional potential change, while the current in the transformer nearest the source of energy either remains constant or rises in value, thus upsetting the system of equal potential, as hereinbefore described. When there is a transient surge set up in a conductor, due either to lightning discharge or dielectric influences of a passing cloud, one transformer will receive more current than the other and, consequently, will alter the equipotential system until there will be sufficient voltage across a trip coil to isolate a section of the same.

We claim as our invention:

1. Protective apparatus for alternating current distribution systems comprising series transformers and resistances at the respective ends of each section to be protected, pilot conductors connecting the secondary windings of the series transformers in series with the resistances, and circuit breakers for isolating the section in case of a fault therein having tripping coils connected between points in said secondary windings and points in the resistances or pilot wires which are at the same potential under normal conditions of current flow in the section.

2. Protective apparatus for alternating current distribution systems comprising a series transformer, a resistance and a circuit breaker at each end of each section to be protected and a pilot wire connecting the secondary windings of the transformers and the resistances in series, the tripping coil of the circuit breaker at each end of a section being connected between points in the pilot wire system which are at the same potential under normal conditions of current flow in the section.

3. Protective apparatus for an alternating current distribution system comprising series transformers and resistances at the ends of each section to be protected, a pilot wire connecting the transformer secondary windings and the resistances for each section in series in a closed circuit, and circuit breakers the tripping coils of which are connected between intermediate points in the adjacent transformer secondary windings and points in the pilot circuit that are at the same potential under normal conditions of current flow in the section.

4. Protective apparatus for an alternating current distribution system comprising series transformers and resistances at the ends of each section to be protected, the secondary windings of the transformers at the same end of each section being connected in parallel relation, pilot wires connecting the transformer secondary windings and resistances at opposite ends of each section in series in a closed circuit, and circuit breakers the tripping coils of which are connected between intermediate points in the adjacent transformer secondary windings and points in the pilot circuit that are at the same potential under normal conditions of current flow in the section.

5. Protective apparatus for an alternating current distribution system comprising series transformers and resistances at the ends of the sections to be protected, certain of the secondary windings of adjacent transformers being connected in parallel relation and in series with certain others of said secondary windings, pilot wires connecting the transformer secondary windings at opposite ends of the protected sections in series in a closed circuit, the resistances being included in the said connections, and circuit breakers the tripping coils of which are connected between intermediate points in the adjacent transformer secondary windings and points in the pilot circuit that are at the same potential under normal conditions of current flow in the section.

In testimony whereof, we have hereunto subscribed our names this 23rd day of March, 1911.

GEORGE HARLOW.
KARL MARTIN FAYE-HANSEN.

Witnesses:
   JAS. STEWART BROADFOOT,
   PERCY WM. HOLT.